United States Patent [19]

Martignoni et al.

[11] 4,260,653
[45] Apr. 7, 1981

[54] SUPPORTS AND PREPARATION PROCESS FOR THE MANUFACTURE OF A CALCIUM CHEMICAL PUMP FOR HF/DF LASER

[75] Inventors: Pasquale Martignoni; James A. Murfree, both of Huntsville; Henry A. Nappier, Laceys Spring; Orval E. Ayers, Huntsville, all of Ala.; William M. Chew, Yorba Linda, Calif.

[73] Assignee: The United States of America as represented by the Secretary of the Army, Washington, D.C.

[21] Appl. No.: 87,116

[22] Filed: Oct. 22, 1979

[51] Int. Cl.³ .......................... B05D 3/00; B05D 1/02
[52] U.S. Cl. ......................... 427/247; 252/181.7; 417/48; 427/243; 427/294; 427/295; 427/425
[58] Field of Search ............... 427/243, 244, 247, 425, 427/294, 295, 255.5; 252/181.6, 181.7, 477 R; 417/48

[56] References Cited

U.S. PATENT DOCUMENTS

| 2,082,268 | 6/1937 | Varian | 417/48 |
| 3,617,349 | 11/1971 | Prasse | 427/425 X |
| 3,992,685 | 11/1976 | Ogren et al. | 252/181.6 X |
| 3,998,758 | 12/1976 | Clyde | 252/477 R X |
| 4,090,979 | 5/1978 | Ogren et al. | 252/441 |
| 4,146,497 | 3/1979 | Barosi | 417/48 X |

Primary Examiner—Evan K. Lawrence
Attorney, Agent, or Firm—Nathan Edelberg; Robert P. Gibson; James T. Deaton

[57] ABSTRACT

A process for producing a calcium chemical pump which includes reacting calcium and anhydrous ammonia in a closed vessel that is cooled to a temperature below 0° C. to form a solution of the calcium and anhydrous ammonia and then spraying the solution onto a rotating porous foamed substrate material in a closed container that has a vacuum pulled thereon, and the solution when sprayed causing the ammonia to flash and be evaporated and drawn off by the vacuum to cause the calcium to be deposited on the rotating porous foamed substrate material.

4 Claims, 4 Drawing Figures

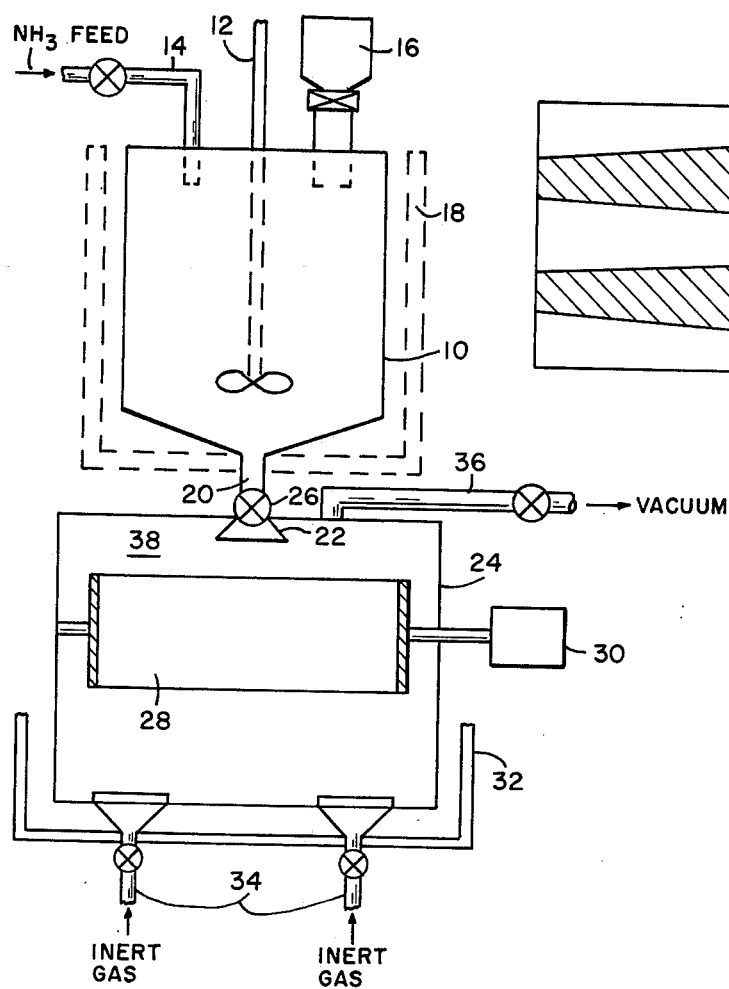
FIG. 1
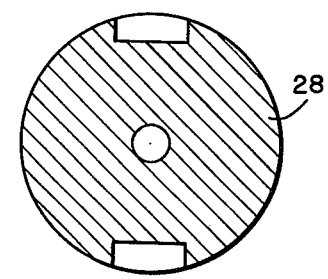
FIG. 2
FIG. 3
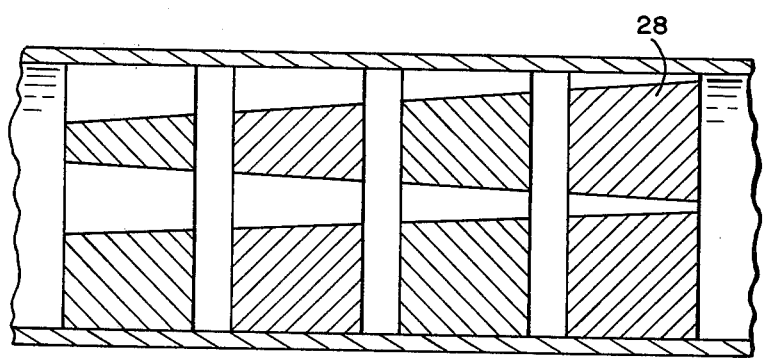
FIG. 4

SUPPORTS AND PREPARATION PROCESS FOR THE MANUFACTURE OF A CALCIUM CHEMICAL PUMP FOR HF/DF LASER

DEDICATORY CLAUSE

The invention described herein may be manufactured, used, and licensed by or for the Government for governmental purposes without the payment to us of any royalties thereon.

BACKGROUND OF THE INVENTION

In combustion-driven chemical lasers such as HF/DF chemical laser there is a need for a cheaper and more easily made chemical pump or cartridge for a combustion-driven chemical laser.

Therefore, it is the object of this invention to provide a simple process that utilizes a new support material that is being rotated in such a manner as to have a substantially uniform layer of calcium deposited thereon and of a continuous process so as to require a minimum of handling prior to using of the pump or cartridge in a chemical laser.

A further object of this invention is to utilize a process which does not require as low temperatures as is required in other processes.

Still another object of this invention is to employ a substrate material that has such large surface area that calcium can be deposited thereon and have a large surface area available for reacting with the spent laser gases.

Other objects and advantages of this invention will be obvious to those skilled in this art.

SUMMARY OF THE INVENTION

In accordance with this invention, a much improved chemical pump is produced using the process of reacting ammonia and calcium in a closed vessel that is evacuated and maintained at a temperature between about 0° C. and −30° C. to form a solution of the calcium and ammonia. The solution is then passed from the evacuated vessel by pumping means to a second closed container or vessel in which a substrate of a foamed metal or ceramic material is being rotated at substantially a constant speed and onto which a spray nozzle in the second container sprays the solution of calcium and ammonia. Upon contacting the substrate material and as the solution is being sprayed, the ammonia will flash and since the second container has a vacuum pulled thereon, the ammonia will be drawn off by the vacuum and the calcium will be deposited in the pores of the foamed material as it is being rotated in the second closed container. If desired, an inert gas, such as argon, can be injected into the second closed container to aid in pressurizing the deposited calcuim on the foamed substrate material. Also, the second container is maintained at about room temperature with a thermally controlled bath about the second container to cause the calcuim to be deposited as desired.

BRIEF DESCRIPTION OF THE DRAWING

FIG. 1 is a schematic illustration of the structure used in carrying out the process of this invention, FIG. 2 is a sectional view of a particularly shaped substrate material used in this invention, FIG. 3 is a sectional view along line 3—3 of FIG. 2, and FIG. 4 is another view illustrating substrate material configurations that can be used in accordance with this invention.

DESCRIPTION OF THE PREFERRED EMBODIMENT

Referring now to the drawing, the apparatus for carrying out the process of this invention includes an evacuated vessel 10 that is evacuated in a conventional manner and has a stirrer 12 that is rotated in a conventional manner for providing mixing means. Evacuated vessel 10 also has controlled inlet means 14 by which ammonia can be fed into the evacuated vessel and calcium feed means 16 for introducing calcium as desired into evacuated vessel 10. A temperature bath 18 is mounted about vessel 10 in a conventional manner to cool vessel 10 and the contents thereof to a temperature between about 0° to about −30° C. Evacuated vessel 10 is connected at the bottom through conventional tubing 20 to a spray nozzle 22 that is mounted at the top of closed container 24. Interconnecting tubing 20 has conventional valving and pump means 26 for allowing passage of the solution from evacuated vessel 10 to nozzle 22 as desired. Closed container 24 has a foamed substrate material 28 that is rotatably mounted in closed container 24 and is rotated by conventional motor drive means 30 that rotates foamed substrate material 28 at a constant speed of from about 10 to about 60 RPM. A temperature bath 32 is provided around closed container 24 for maintaining container 24 and the contents therein at a temperature of approximately room temperature. That is, bath 32 maintains the temperature of container 24 and the contents thereof at a temperature of between about 70° to about 75° F. Closed container 24 is provided with supply and control means 34 for allowing inert gas such as argon to be introduced into closed container 24 as desired. An outlet 36 at the top of closed container 24 has conventional valving means therein and has a vacuum pulled thereon to maintain a vacuum in chamber 38 of closed container 24.

Foamed substrate material 28 has a porosity of between about 70 to about 95 percent and perferrably the porosity is about 90 percent. Materials that have these required porosity characteristics are foamed copper, nickel and alumina. Other foamed materials that have this porosity characteristic can be used if they have the large surface areas produced by foamed substrate materials.

Referring now to FIGS. 2 and 3, a particularly shaped substrate material is illustrated with a conical opening in the center and with grooves around the outer periphery. These shapes are only illustrated to point out the adaptability of this type foamed substrate material to its ability to be made in many shapes so as to support a large amount of calcium per volume due to its large surface area and the percent of porosity of the material. The number of conical holes as well as the number of grooves around the periphery can be varied as desired in order to provide as free access to the calcium deposited on the foamed substrate material as is desired. FIG. 4 illustrates another embodiment in which a plurality of foamed substrate materials 28 are mounted parallel to each other to provide a chemical pump for laser gas.

In carrying out the process of this invention, $NH_3$ is introduced through inlet 14 and Ca is introduced through calcium feed means 16 in the required proportion and are reacted in cooled evacuated vessel 10 to form a reaction solution in accordance with the formula
Ca+6NH$_3$→Ca(NH$_3$)$_6$ (dissolved)+Ca(dissolved)+NH$_3$(excess). Stirrer 12 is used to mix the ingredients and cause a uniform reaction solution to be formed. The reaction solution is passed through tube 20 by valve and pump means 26 to spray nozzle 22 which sprays the reaction solution onto substrate 28 which is being rotated at a constant speed by motor means 30. When the reaction solution is sprayed from nozzle 22 onto substrate 28, ammonia will flash and the vacuum being pulled on outlet 36 will draw off the ammonia and calcium will be deposited in the pores of foamed substrate material 28 to cause a build up of the calcium. When the desired amount of calcium has been deposited on foamed substrate material 28, valve and pump means 26 is shut off and flow of the reaction solution is stopped. If it is desired to pressurize the calcium on the foamed substrate material, an inert gas such as argon enters through inlets 34 into chamber 38 and pressurizes chamber 38 to slightly pressurize the chamber and thereby the calcium powder deposited in the pores of foam substrate material 28. With this completed, substrate 28 is ready to be removed and used as a chemical pump. As can be seen, by utilizing a substrate material of a foamed material as done by applicants and by utilizing the high porosity of from 70 to 90 percent a relatively small substrate material can be loaded with a sufficient amount of calcium to provide a chemical pump of a single substrate material or by a small number of the substrate materials. This is made possible in that the foamed substrate material has such a large surface area that large quantities of calcium can be deposited in the substrate material when using this process. Therefore, the product produced by this process is an improvement over the processes.

We claim:

1. A process for producing an improved calcium chemical pump, comprising reacting calcium and anhydrous ammonia in an evacuated vessel that is cooled to a temperature between 0° C. and −30° C. to form a solution of the calcium and anhydrous ammonia, spraying said solution onto a porous foamed substrate material that is being rotated in a closed container that is being maintained at about room temperature, and maintaining a vacuum in said closed container as said solution is being sprayed into said closed container and onto said substrate material to cause ammonia to be drawn off by said vacuum and calcium to be deposited throughout the porous foamed substrate material as said substrate material is being rotated.

2. A process for producing an improved calcium chemical pump as set forth in claim 1, wherein an inert gas is introduced into said closed container after said calcium has been deposited to pressurize said closed container.

3. A process for producing an improved calcium chemical pump as set forth in claim 1, wherein said substrate material is selected from the group consisting of copper, nickel and alumina and said substrate material has a porosity of between 70 and 95 percent.

4. A process for producing an improved calcium chemical pump as set forth in claim 3, wherein said substrate material has a porosity of about 90 percent.

* * * * *